(12) United States Patent
Faulkner

(10) Patent No.: US 6,894,504 B2
(45) Date of Patent: May 17, 2005

(54) TECHNIQUE FOR ESTIMATION OF A SUBSCRIBER LINE INSERTION LOSS

(75) Inventor: Roger Faulkner, Swindon (GB)

(73) Assignee: Teradyne, Inc., Boston, MA (US)

( * ) Notice: Subject to any disclaimer, the term of this patent is extended or adjusted under 35 U.S.C. 154(b) by 71 days.

(21) Appl. No.: 10/220,716

(22) PCT Filed: Mar. 5, 2001

(86) PCT No.: PCT/GB01/00936

§ 371 (c)(1),
(2), (4) Date: Nov. 26, 2002

(87) PCT Pub. No.: WO01/67729

PCT Pub. Date: Sep. 13, 2001

(65) Prior Publication Data

US 2003/0147508 A1 Aug. 7, 2003

(30) Foreign Application Priority Data

Mar. 3, 2000 (GB) ............................................. 0005227

(51) Int. Cl.⁷ ........................ H01H 31/04; G01R 19/00

(52) U.S. Cl. ........................ 324/539; 324/538; 324/66; 379/399.01

(58) Field of Search ................................ 324/520, 521, 324/527, 537, 539, 616, 76.11, 76.12; 379/399.01, 1.01, 23, 24, 29.05, 30

(56) References Cited

U.S. PATENT DOCUMENTS 6,115,466 A * 9/2000 Bella ...................... 379/399.01
6,177,801 B1 * 1/2001 Chong ........................ 324/520

* cited by examiner

Primary Examiner—Vincent Q. Nguyen
(74) Attorney, Agent, or Firm—Teradyne Legal Department

(57) ABSTRACT

A method and apparatus for pre-qualifying lines with respect to estimating the insertion loss of the line is presented. End-to-end insertion loss at high frequencies is estimated from measurements made at low frequencies through the voice switch at the central office of a telephone company. An AC voltage waveform is applied to the telephone line being tested. Real and imaginary components of the resultant waveform are measured. These measurements are captured and used to estimate the insertion loss of the telephone line at frequencies in the range of 40 kHz to 300 kHz.

23 Claims, 2 Drawing Sheets

TECHNIQUE FOR ESTIMATION OF A SUBSCRIBER LINE INSERTION LOSS

BACKGROUND OF THE INVENTION

This invention relates generally to communication networks and more particularly to systems for qualifying telephone lines for data transmission. As is known in the art, public switch telephone networks, i.e., so-called plain old telephone service (POTS) lines, were originally designed for voice communications, which cover a limited frequency bandwidth (i.e., about 4 KHz). Today, it is desired to use the same POTS lines for data transmission. Data signals, however, generally have different frequency characteristics than voice signals. As a result, a POTS line that works well transmitting voice signals might not work well, or at all, for data signals. Telephone companies need to know which lines are suitable, i.e., qualify, and which lines are not suitable for data transmission. Telephone companies also need to know why particular lines are unable to support data transmissions and where such faults occur so they can determine whether the transmission line can be corrected.

There are problems for telephone operating companies (TELCO's) attempting to qualify subscriber loops for delivery of data. One problem is strategic. Telco's are reluctant to deploy emerging technologies for the delivery of data (e.g., ISDN or ADSL) because there is uncertainty in their knowledge that sufficient of the subscriber loops are of high enough quality to make deployment economically successful. This discourages early adopters because there is significant risk in being first to deliver a technology that may not work in their access network. If Telco's could be given a technology to take much of this risk out of initial deployment, they can secure market share and lead in the face of competition An additional problem is tactical and comes after a Telco has made a decision to deploy a particular technology. There is a need to qualify, either pro-actively or reactively, specific lines for service as that service is requested by subscribers or targeted by the Telco for delivery. Line Qualification is the overall ability to make statements about the quality of a subscriber loop as it relates to its ability to deliver voice communications (i.e. POTS), or data services. Disqualification is the ability to make a statement with a high degree of confidence that a subscriber loop will not support a data service without remedial actions. Pre-qualification is the ability to make a statement with a high degree of confidence that a subscriber loop will support a data service without remedial actions before attempting to deploy such data services.

When a Telco is able to market and deliver the new service, they would like to target those subscriber loops most likely to support the service out of the box and/or with a minimum of work. As another example, a Telco receiving a new service request from a subscriber desires information to either accept or reject that request for new service based on the condition of the line associated with the subscriber.

A telephone company would like to pre-qualify a line for high data rate operation, such as ISDN and ADSL. Lines that have been pre-qualified can be leased at a higher price. Lines that fail the pre-qualified testing would not be made available for these high data rate services.

SUMMARY OF THE INVENTION

With the foregoing background in mind, it is an object of the present invention to provide a method and apparatus for pre-qualifying telephone lines with respect to estimating the insertion loss of the telephone line. End-to-end insertion loss at high frequencies is estimated from single-ended measurements made at low frequencies through the voice switch at the central office of the Telephone Company. An AC voltage waveform is applied to the telephone line being tested. Real and imaginary components of the resultant waveform are measured. These measurements are captured and used to estimate the insertion loss of the telephone line at frequencies in the range of 40 kHz to 300 kHz.

BRIEF DESCRIPTION OF THE DRAWINGS

The invention will be better understood by reference to the following more detailed description and accompanying drawings in which.

DESCRIPTION OF THE PREFERRED EMBODIMENT

The telephone network was originally designed for voice communication. Voice communication covers a limited frequency bandwidth. In some cases, telephone lines were optimized for signals within this frequency range (approximately 4 kHz). Even where the lines were not optimized for voice signals, there was no incentive to make the lines operate at other frequencies and often they did not. Now, it is desired to use those same lines to carry data signals. The data signals generally have different frequency characteristics than the voice signals. As a result, a line that works very well transmitting voice signals might not work well or at all for data signals. Phone companies need to know which lines will work for data signals and use those lines for data.

Figure 1:
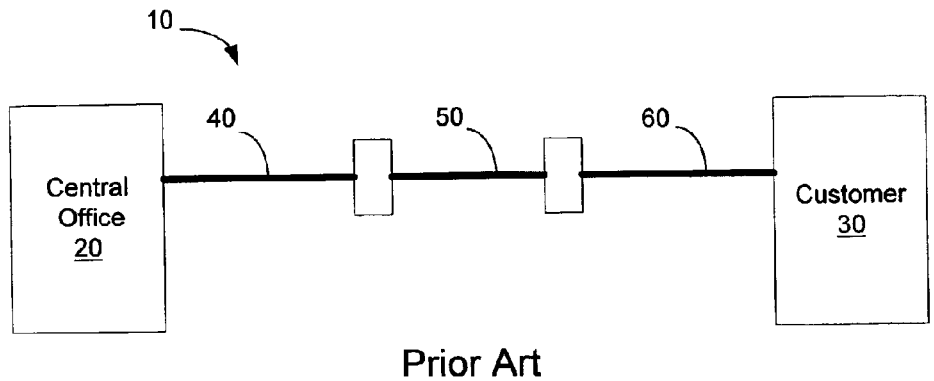
FIG. 1 is a block diagram of a prior art telephone system from a central office to a customer.

Referring to FIG. 1, a prior art portion of a telephone system 10 is shown. The system includes a telephone company central office 20 which has a line extending to a customer 30. The line 40 includes at least two wires, a tip wire ad a ring wire which are used to provide communication between the central office and the customer 30. The line may be comprised of multiple segments 40, 50 and 60. A first segment 40 may be of a particular gauge. A following segment 50 may be of a different gauge then the first segment 40. A third segment 60 may also be of a different gauge than first segment 40 and second segment 50.

There are a number of factors which decrease the end to end data rate attainable on a pair of wires of a telephone line. Some of these factors are imbalanced lines, contact faults and the like. Given that a telephone line has no other parasitic conditions, the operation of the service on the line ultimately depends on the overall attenuation or insertion loss of the wire pair to the signal applied. Currently telephone companies measure insertion loss by deploying personnel to either end of the wire pair to measure the insertion loss at different frequencies (e.g. 100 kHz, 300 kHz, etc.) through hand held instruments. This procedure is expensive, labor intensive, and time consuming.

Figure 2:
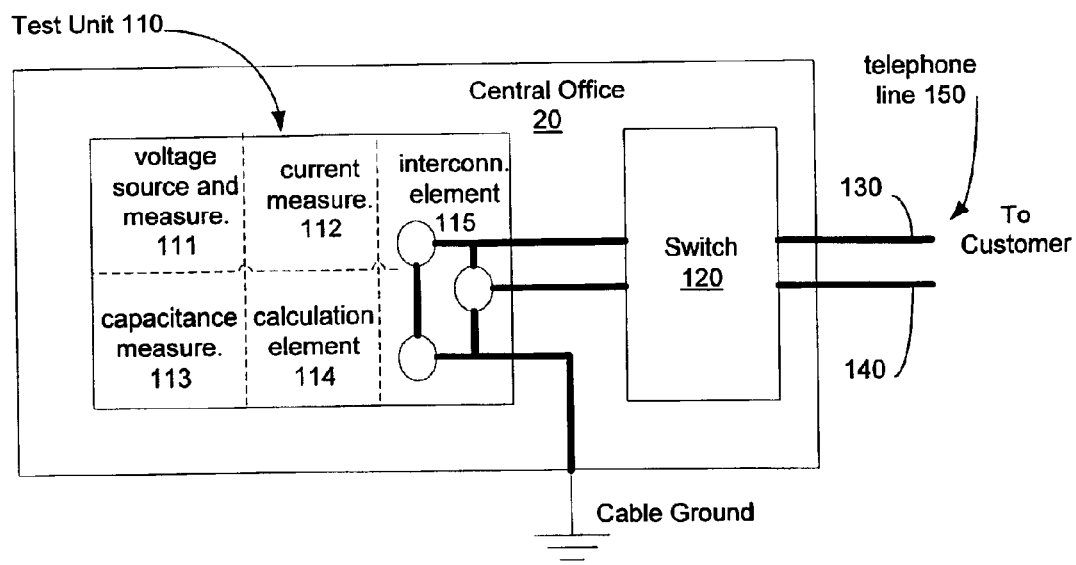
FIG. 2 is a block diagram of the remote measuring unit coupled to the switch test access of the central office.

Referring now to FIG. 2, a block diagram of the present invention 110 is shown coupled to a selected telephone line 150. In this embodiment a test unit 110 is located within the central office 20 of a telephone company. The test unit 110 includes an interconnection element 115, a voltage measurement element 111, a current measurement element 112, a capacitance measurement element 113 and a calculation element 114. The test unit 110 measures the wires 130 and 140 of a selected telephone line 150. The wires 130 and 140 are accessed through a voice switch 120. As such, the test unit 110 may access a plurality of telephone lines through the switch 120, thus providing measurements of several telephone lines quickly and easily. By utilizing the voice switch 120, the injected signals are limited to the voice band, that is up to about 4 kHz.

The test unit 110 comprises a hardware/software system specifically developed for estimating insertion loss of a telephone line. The software includes commands and data for directing the hardware to perform the various functions such as interconnecting the tip and ring wires of a telephone line, applying a voltage to a telephone line, measuring the capacitance of a telephone line, measuring the voltage of a telephone line, measuring the current in a telephone line, and calculating the estimated insertion loss of the telephone line. Other functions may also be provided. The test unit 110 also includes storage for storing the values of the measured variables as well as storing the commands and data associated with estimating the insertion loss of the selected telephone line.

By way of test unit 110, the wires 130 and 140 of the selected telephone line 150 are placed in electrical contact with each other by interconnect element 115. This is done to cancel any effects that may result from a customer terminating device on the selected telephone 150. The test unit 110 utilizes the capacitance measurement element 113 to perform a lumped capacitance measurement of the wires 130, 140 to ground. This lumped capacitance measurement is made at a low frequency, for example at approximately 1 kHz or less.

The test unit 110 applies a common mode AC voltage between the wires 130, 140 and ground. The test unit 110 utilizes the voltage measuring element to measure the AC voltage between the wires 130, 140 and ground. The current measuring element 112 is utilized to measure the driving AC current through the wires. The measured AC voltage is divided by the measured AC current to give the impedance Z.

Test unit 110 utilizes the calculation element 114 to estimate the insertion loss of the selected telephone line at a high frequency, for example 100 kHz, according to the formula:

$$\text{Insertion loss at 100 kHz} = \frac{5000}{\sqrt{(Z^2 + [1/\omega C]^2)}} \text{dB}$$

Wherein Z is equal to the measured voltage divided by the measured current, C is equal to the measured capacitance, and ω is 2π times the driving frequency.

The above-described apparatus is useful for performing estimations of insertion loss of a telephone line at a high frequency. The estimation is accomplished by making low frequency single-ended measurements of the line. The measurements can be made at the central office of the Telephone Company and the measurements do not require knowledge of the physical characteristics of the telephone line being measured.

Figure 3:
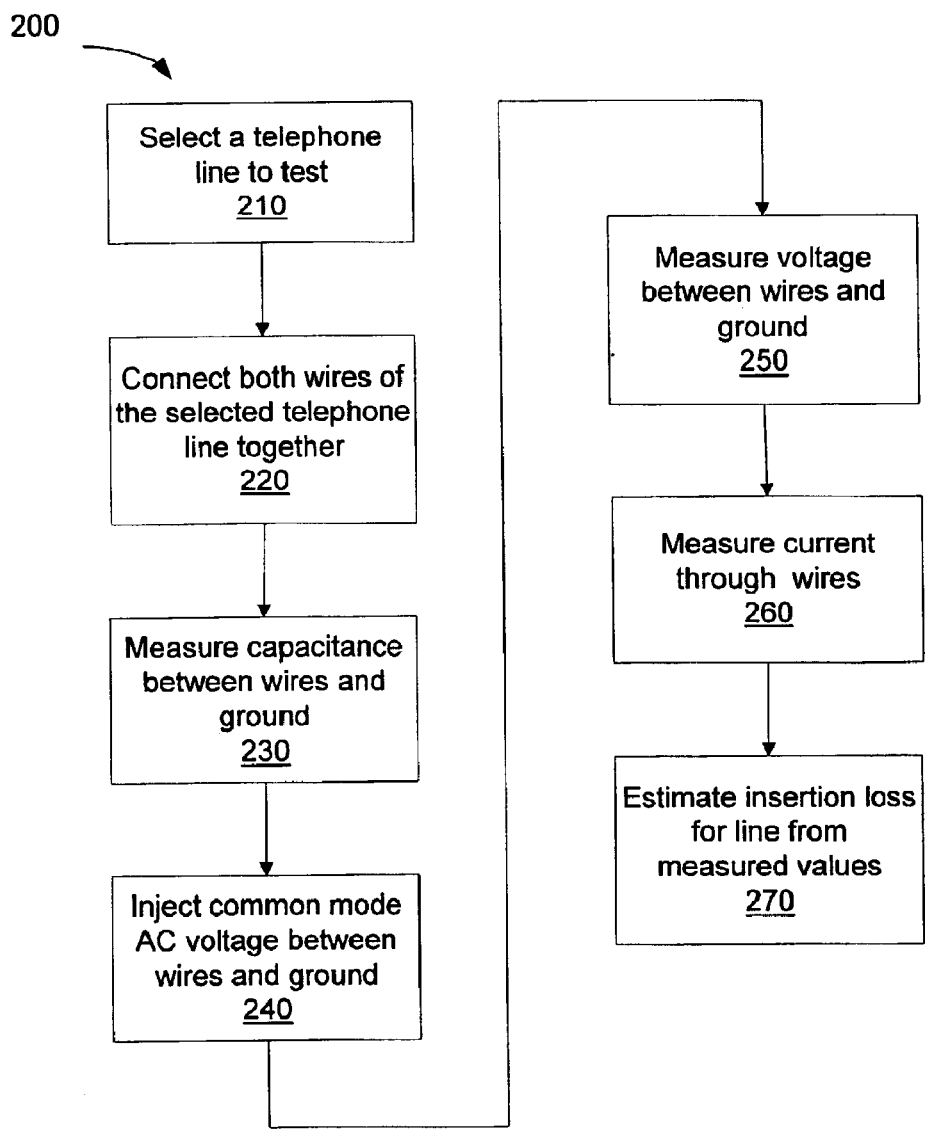
FIG. 3 is a flow chart of a method of measuring insertion loss of a telephone line.

Referring now to FIG. 3, a flowchart showing a method 200 of estimating the insertion loss of a subscriber line is shown. The first step 210 is to select a telephone line to measure. Typically the line is accessed through the voice switch at the central office of the Telephone Company.

The next step, 220, is to connect the tip and ring wires of the selected phone line to each other. This is done to cancel the effects of any terminating device on the selected telephone line.

The following step 230 measures the capacitance between the wires and ground. This measured capacitance value is stored for later use. The capacitance measurement is made at a low frequency such as 1 kHz or less. As such, the measurement can be made through the voice switch at the central office.

At step 240 a common mode AC voltage having a driving frequency of between approximately 2 kHz and approximately 6 kHz, and preferably less than approximately 5 kHz, is applied between the wires of the selected telephone wire and ground. Real and imaginary components of the resultant waveform will be measured, as described in the following steps.

At step 250 the resultant voltage between the wires and ground is measured and recorded. At step 260 the resultant current flow in the wires is measured and recorded.

At step 270 the insertion loss at a high frequency is estimated from the low frequency measurements. The insertion loss of the selected telephone line is calculated according to the formula:

$$\text{Insertion loss at 100 kHz} = \frac{5000}{\sqrt{(Z^2 + [1/\omega C]^2)}} \text{dB}$$

Where Z is equal to the measured voltage divided by the measured current, C equal to the measured capacitance and ω is 2π times the driving frequency.

The above-described method provides for performing estimations of insertion loss of a telephone line at a high frequency. The estimation is accomplished by making low frequency single-ended measurements of the line. The measurements can be made at the central office of the Telephone Company and the measurements do not require knowledge of the physical characteristics of the telephone line being measured.

Having described preferred embodiments of the invention it will now become apparent to those of ordinary skill in the art that other embodiments incorporating these concepts may be used. Additionally, the software included as part of the tool may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of estimating insertion loss of a subscriber line comprising the steps of:

placing both wires of a selected telephone line in electrical contact with each other;

obtaining a single-ended measurement of a capacitance between said selected telephone line and ground;

applying an AC voltage between said selected telephone line and ground;

obtaining a single-ended measurement of a voltage between said selected telephone line and ground;

obtaining a single-ended measurement of a current in said selected telephone line; and estimating an insertion loss from said capacitance, said voltage and said current measurements.

2. The method of claim 1 wherein said step of obtaining a single-ended measurement of capacitance comprises obtaining a single-ended measurement of the capacitance at a first frequency.

3. The method of claim 2 wherein said first frequency is less than approximately 1 kHz.

4. The method of claim 2 wherein said step of applying an AC voltage comprises applying an AC voltage at a second frequency.

5. The method of claim 4 wherein said second frequency is between approximately 2 kHz and approximately 6 kHz.

6. The method of claim 4 wherein said second frequency is less than approximately 5 kHz.

7. The method of claim 4 wherein said step of estimating an insertion loss comprises estimating an insertion loss at a third frequency.

8. The method of claim 7 wherein said step of estimating an insertion loss is performed according to the formula:

$$\frac{5000}{\sqrt{(Z^2 + [1/\omega C]^2)}} dB$$

wherein Z is equal to said voltage divided by said current, C is equal to said capacitance and ω is 2π times said second frequency.

9. The method of claim 7 wherein said third frequency is between approximately 40 kHz and approximately 300 kHz.

10. The method of claim 9 wherein said second frequency is approximately 100 kHz.

11. The method of claim 1 wherein said method is performed through a switch of a central office.

12. The method of claim 1 wherein said method is performed on-demand.

13. The method of claim 1 wherein said method is performed routinely.

14. An apparatus for estimating insertion loss of a subscriber line comprising:

a connection element placing both wires of a selected telephone line in electrical contact with each other;

a single-ended capacitance measuring element coupled to said connection element and measuring a capacitance between said selected telephone line and ground;

a voltage source coupled to said connection element and providing an AC voltage between said selected telephone line and ground;

a single-ended voltage measuring element coupled to said connection element and measuring a resulting voltage between said selected telephone line and ground;

a single-ended current measuring element coupled to said connection element and measuring a current in said selected telephone line; and a calculation element in communication with said single-ended capacitance measuring element, said single-ended voltage measuring element and said single-ended current measuring element, said calculation element determining an insertion loss from said capacitance, said resulting voltage and said current measurements.

15. The apparatus of claim 14 wherein said single-ended capacitance measuring element measures a capacitance at a first frequency.

16. The apparatus of claim 15 wherein said first frequency is less than approximately 1 kHz.

17. The apparatus of claim 15 wherein said voltage source provides said AC voltage having a second frequency.

18. The apparatus of claim 17 wherein said calculation element determines an insertion loss at a third frequency.

19. The apparatus of claim 18 wherein said calculation element determines the insertion loss according to the formula $$\text{Insertion loss at 100 kHz} = \frac{5000}{\sqrt{(Z^2 + [1/\omega C]^2)}} dB$$

wherein Z is equal to said voltage divided by said current, C is equal to said capacitance and ω is 2π times said second frequency.

20. The apparatus of claim 18 wherein said third frequency is between approximately 40 kHz and approximately 300 kHz.

21. The apparatus of claim 18 wherein said third frequency is approximately 100 kHz.

22. The apparatus of claim 17 wherein said second frequency is between approximately 2 kHz and approximately 6 kHz.

23. The apparatus of claim 17 wherein said second frequency is less than approximately 5 kHz.

* * * * *